Inventors:
Allen C. Wideburg
James E. Steffens
By
Bair, Freeman & Molinare Attys.

Sept. 9, 1969     A. C. WIDEBURG ET AL     3,465,449
UNIVERSAL JOINT TESTER
Filed April 30, 1964     2 Sheets-Sheet 2
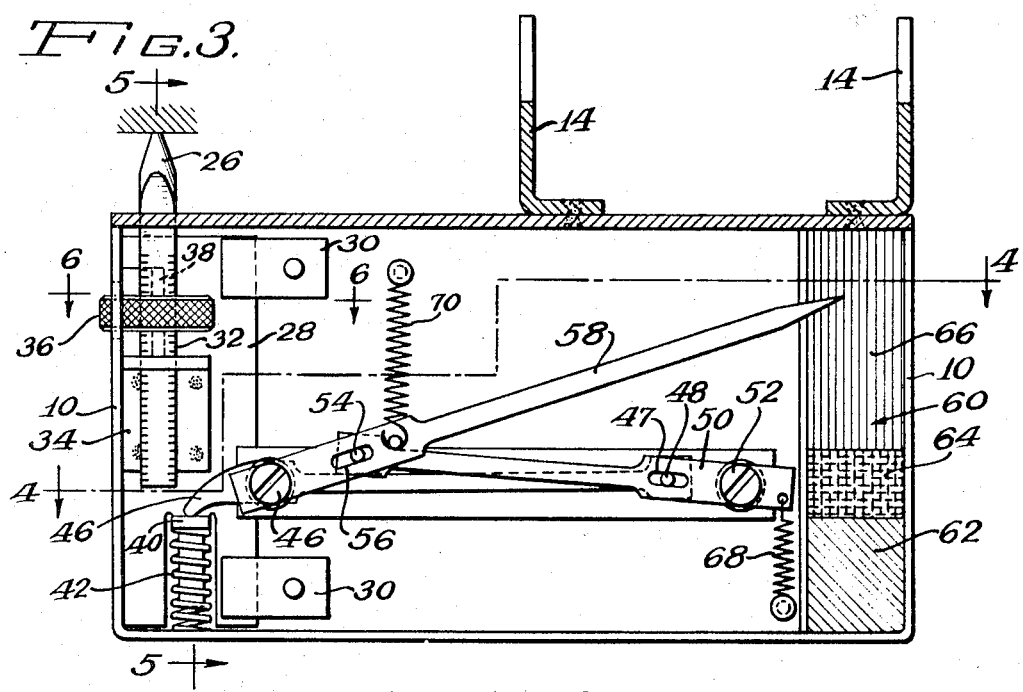
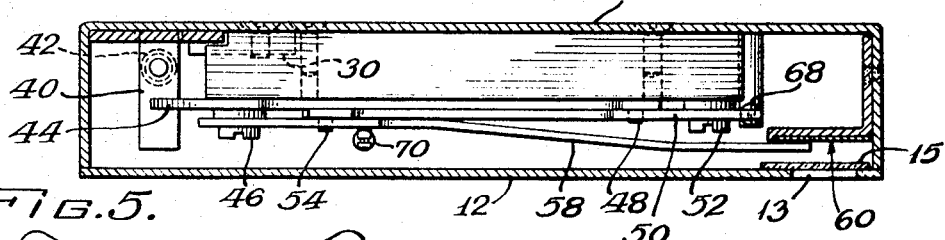
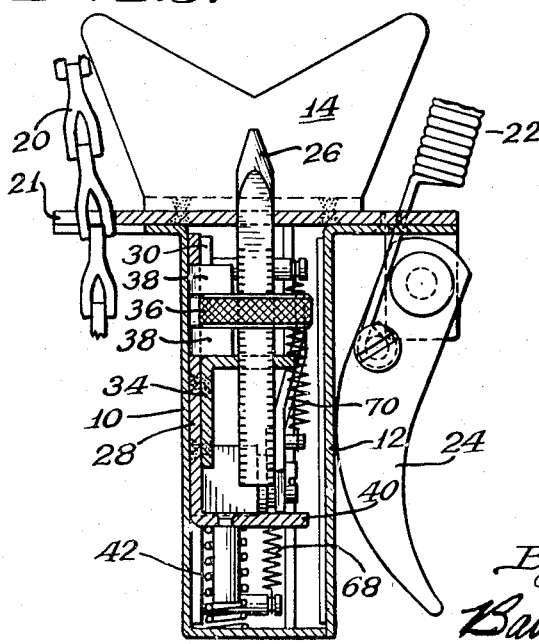
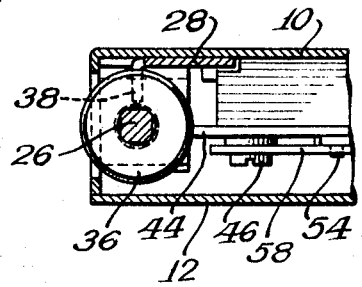
Inventors:
Allen C. Wideburg
James E. Steffens
By Bair, Freeman & Molinare Attys.

United States Patent Office 3,465,449
Patented Sept. 9, 1969

3,465,449
UNIVERSAL JOINT TESTER
Allen C. Wideburg and James E. Steffens, Chicago, Ill., assignors to Avrum G. Gray, Chicago, Ill., and Sheldon Gray, Glencoe, Ill.
Filed Apr. 30, 1964, Ser. No. 363,831
Int. Cl. G01b 3/22
U.S. Cl. 33—172                                    4 Claims This invention relates to a universal joint tester particularly adaptable for the use of garage mechanics and service station attendants in checking the looseness of a universal joint on an automobile or the like and determining if it has excessive wear and therefore requires replacement.

Another object is to provide a universal joint tester in the form of a housing having a pair of spaced V-seats adapted to seat against a drive shaft, and having spring, chain and toggle lever means for holding the same seated relative thereto, a detector head projecting from the housing for contact with a universal joint trunnion and connected within the housing by a lever system to a gauge needle to be read against a gauge dial to indicate the condition of the universal joint.

Another object is to provide an efficient and sensitive lever system to serve as an operative connection between the detector head and the gauge needle comprising a first lever extending from a slide that carries the detector head toward the dial, a second lever extending in the opposite direction, and the needle constituting a third lever extending again in the direction of the dial and terminating thereover.

A further object is to provide means for adjusting the detector head relative to the lever system comprising the slide which carries the detector head, and a threaded rod and adjusting wheel arrangement for securing the adjustment referred to.

With these and other objects in view, our invention consists in the construction, arrangement and combination of the various parts of our universal joint tester, whereby the objects above contemplated are attained, as hereinafter more fully set forth, pointed out in our claims and illustrated in detail on the accompanying drawings, wherein:

FIG. 3 is a similar view showing the position of the parts when the joint is so worn that it requires replacement;

FIG. 4 is a horizontal sectional view on the line 4—4 of FIG. 3 showing details of construction;

FIG. 5 is a horizontal sectional view on the line 6—6 of FIG. 3 showing further details of construction, and FIG. 6 is a vertical sectional view on the line 5—5 of FIG. 3.

Figure 1:
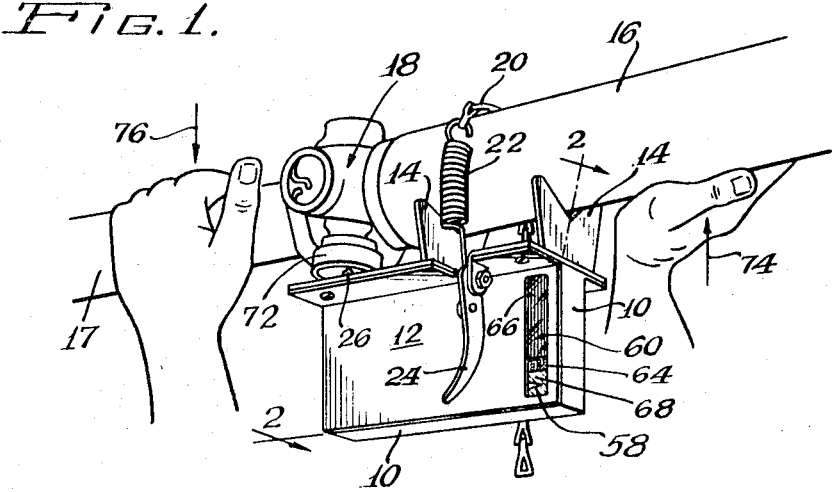
FIG. 1 is a perspective view of our universal joint tester showing it in use.

On the accompanying drawings we have used the reference numeral 10 to indicate a housing which has one side open, and 12 a cover for the open side of the housing whereby the parts 10 and 12 form a complete enclosure for a lever system and other mechanism as will hereinafter appear. The housing 10 has a pair of V-seats 14 secured thereto as by spot welding and adapted to seat against a drive shaft 16 of an automobile or the like adjacent a universal joint shown generally at 18. The housing 10 is adapted to be securely fixed in relation to the drive shaft 16 which may be accomplished by means of a chain 20 adjustable in a slot 21 of the housing, a spring 22 and a toggle lever 24.

Figure 2:
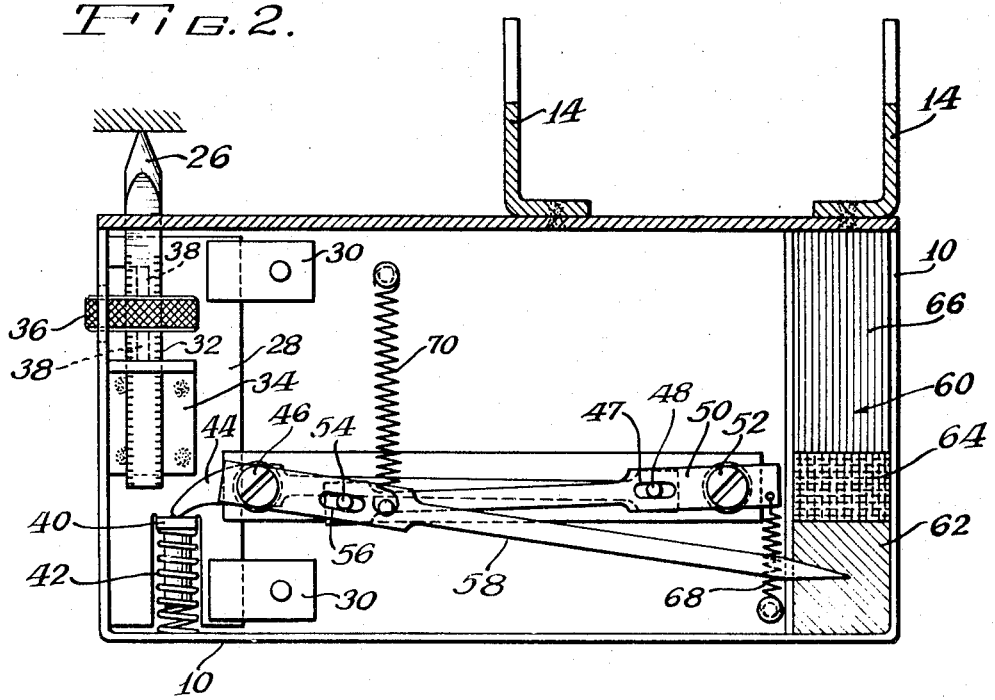
FIG. 2 is an enlarged vertical sectional view on the line 2—2 of FIG. 1 showing the tester in initially adjusted position preparatory to testing the universal joint.

In one end of the housing 10 we provide a detector head 26 carried by a slide 28. A pair of brackets 30 coact with the slide 28 to confine it to sliding movement relative to the housing. The detector head 26 is in the form of a threaded rod, the threads of which are indicated at 32 and provided on each of the four corners of the rod, its cross section being square as shown in FIG. 6. The square section slides but is non-rotatable in a bracket 34 spot welded to the slide 28. An adjusting wheel 36 is threaded on the rod 26 and is rotatable relative to both the rod and the slide 28 but confined against axial movement relative to the slide by means of a pair of ears 38 struck up from the slide and straddling the adjusting wheel as shown in FIG. 5 and by dotted lines in FIGS. 2 and 5.

The slide 28 has a projection 40 against which a spring 42 is positioned for normally elevating the slide 28 to its maximum position as permitted by a folded lever system which will now be described.

The folded lever system referred to comprises a first lever 44 pivoted at 46 and having its left-hand end engaging the top of the projection 40 whereas its right-hand end is provided with a pin 48 engaged in a slot of a second lever 50. The second lever is pivoted at 52 and has a pin 54 engaged in a slot 56 of a gauge needle 58 which constitutes a third lever pivoted also at 46.

The lever system disclosed comprising the three levers 44, 50 and 58 secures approximately .160" of movement at the extremity of the needle 58 (right-hand end in FIG. 2) compared to the movement of the projection 40 whenever the projection 40 moves about .001". Thus, the lever system is extremely sensitive and has a range of about .012" of the slide 28 (comparing FIG. 3 with FIG. 2) for a dial 60 about 2" high.

A gauge dial shown generally at 60 is adapted to be read against the gauge needle 58 and has preferably green, yellow and red areas 62, 64 and 66, respectively. The dial is observable through a sight opening 13 having a window 15 of transparent plastic or the like.

By having the first lever 44 extend from the projection 40 toward the dial 60, the second lever 50 extend in the opposite direction and the gauge needle 58 extend again toward the dial, a sensitive system of great leverage is compactly arranged within the housing 10. A pair of springs 68 and 70, each having one end anchored to the housing 10 and its other end connected to the second and third levers, serves to keep the left-hand end of the first lever 44 in contact with the projection 40 of the slide 28 and take up any play in the parts so that readings are accurate.

PRACTICAL OPERATION

In the operation of our universal joint tester, the housing 10 is rigidly secured to the drive shaft 16 as shown in FIG. 1 in a position such that the detector head 26 is in alignment with one of the universal joint trunnions such as shown at 72. The operator then adjusts the adjusting wheel 36 until the detector head 26 contacts the trunnion 72 and begins to move the gauge needle 58 upwardly. He continues the adjustment until the needle is approximately centered in the green area 62. The universal joint at this time is in a normal (at rest) position.

The operator, then, by lifting up with one hand on the drive shaft 16 as indicated by the arrow 74 and pulling down with his other hand on the shaft 17 on the opposite side of the universal joint 18 will get a reading on the dial 60 either remaining in the green area 62 if there is very little play in the universal joint, in the yellow area 64 if there is some play but not too much to require replacement or in the red area 66 if the play is so much that replacement is indicated. If the needle 58 reaches the yellow area 64 it is an indication that the joint should be checked again in the near future. If the needle reaches the red area 66, replacement of the universal joint, as too badly worn, is recommended.

From the foregoing specification it will be obvious that we have provided a comparatively simple universal joint tester which, however, is very sensitive and reliable in operation. The tester can be quickly fixed in relation to a drive shaft adjacent the universal joint after which the looseness in the joint can be checked and indicated on the tester. A tester of this type can therefore indicate to the automobile owner a defective universal joint before it wears to the point of breakage and he can replace the joint at the proper time. Furthermore, replacement effects fuel economy inasmuch as a bady worn joint introduces additional friction forces that waste horsepower.

Some changes may be made in the construction and arrangement of the parts of our universal joint tester without departing from the real spirit and purpose of our invention.

We claim as our invention:
1. In a universal joint tester,
    (a) a housing,
    (b) a slide vertically movable in one end of said housing,
    (c) a detector head carried by said slide and projecting from said housing,
    (d) means for adjusting said detector head relative to said slide and said housing, said means engaging said detector head and operatively connected to said slide,
    (e) means for securing said housing in fixed position relative to a drive shaft with said detector head in contact with a universal joint trunnion at one end of such drive shaft comprising:
        (1) a V-seat at the other end of said housing opposite said detector head,
        (2) a second V-seat intermediate the ends of said housing,
        (3) means between said V-seats to hold said V-seats in contact with such drive shaft,
        (4) said V-seats being secured to said housing,
    (f) a gauge needle pivoted in said housing,
    (g) a gauge dial against which said needle may be read, and
    (h) a lever system within said housing operatively connecting said slide to said gauge needle.

2. A universal joint tester according to claim 1 wherein said means to hold said V-seats in contact with such drive shaft comprises a spring, a chain and a toggle lever for drawing said V-seats into seated position.

3. In a universal joint tester, a housing, a slide vertically movable in one end of said housing, a detector head adjustable relative to said slide and projecting from said housing, means for securing said housing in fixed position relative to a drive shaft with said detector head in contact with a universal joint trunnion, at one end of such drive shaft comprising a V-seat at the end of said housing opposite said detector head, a second V-seat intermediate the ends of said housing and means between said V-seats to hold said V-seats in contact with such drive shaft, a gauge needle pivoted in said housing, a gauge dial against which said needle may be read, and a lever system within said housing operatively connecting said slide to said gauge needle, wherein said detector head comprises a square rod having its corners threaded, said slide having a square hole slidably receiving said rod, and an adjustor wheel threaded on said rod, rotatable relative to said slide and confined against axial movement relative to said slide.

4. In a universal joint tester, a housing, a slide vertically movable in one end of said housing, a detector head adjustable relative to said slide and projecting from said housing, means for securing said housing in fixed position relative to a drive shaft with said detector head in contact with a universal joint trunnion, at one end of such drive shaft comprising a V-seat at the end of said housing opposite said detector head, a second V-seat intermediate the ends of said housing and means between said V-seats to hold said V-seats in contact with such drive shaft, a gauge needle pivoted in said housing, a gauge dial against which said needle may be read, and a lever system within said housing operatively connecting said slide to said gauge needle, wherein said means to hold said V-seats in contact with such drive shaft comprises a spring, a chain and a toggle lever for drawing said V-seats into seated position, and wherein said detector head comprises a square rod having its corners threaded, said slide having a square hole slidably receiving said rod, an adjustor wheel threaded on said rod and rotatable relative to said slide, and means for confining said wheel against axial movement relative to said slide comprising a pair of ears projecting from the slide and over opposite faces of said wheel, the operative connection between said slide and said lever system comprising a projection on said slide, spring means biasing said projection toward the universal joint trunnion and toward the end of said lever system opposite said gauge needle, and spring means biasing said lever system to engage said projection.

References Cited
UNITED STATES PATENTS

| | | | |
|---|---|---|---|
| 508,213 | 11/1893 | Fortin | 33—170 |
| 520,201 | 5/1894 | Bath. | |
| 1,427,132 | 8/1922 | Swartout. | |
| 1,825,988 | 10/1931 | Wochner | 33—193 |
| 2,690,016 | 9/1954 | Seaholm | 33—172 |
| 2,726,058 | 12/1955 | Foltz | 33—172 |
| 2,936,526 | 5/1960 | Dupre | 33—170 |

WILLIAM D. MARTIN, JR., Primary Examiner

U.S. Cl. X.R.

33—180, 193